United States Patent [19]

Soga et al.

[11] Patent Number: 5,677,255

[45] Date of Patent: Oct. 14, 1997

[54] POLYSILOXANE SUPPORTED METALLOCENE CATALYST FOR OLEFIN POLYMERIZATION

[75] Inventors: Kazuo Soga; Toshiya Uozumi; Takashi Arai, all of Ishikawa, Japan

[73] Assignee: Daicel Chemical Industries, Ltd., Tokyo, Japan

[21] Appl. No.: 707,522

[22] Filed: Sep. 4, 1996

[30] Foreign Application Priority Data

Sep. 11, 1995 [JP] Japan .................................. 7-232370

[51] Int. Cl.⁶ ........................................................ C08F 4/64
[52] U.S. Cl. .................... 502/111; 502/104; 502/117; 502/120; 502/152; 526/127; 526/160; 526/943
[58] Field of Search ................................ 502/103, 104, 502/111, 117, 120, 152; 526/127, 160, 943

[56] References Cited

U.S. PATENT DOCUMENTS

| 4,542,199 | 9/1985 | Kaminsky et al. | 526/160 |
| 4,931,417 | 6/1990 | Miya et al. | 502/117 |
| 5,409,874 | 4/1995 | Imuta et al. | 502/103 |

FOREIGN PATENT DOCUMENTS

| 0 287 666 | 10/1988 | European Pat. Off. . |
| 61-276805 | 12/1986 | Japan . |

OTHER PUBLICATIONS

Macromol. Rapid Commun. 15, 139–143 (1994) (5 pages).
The Society of Polymer Science, Japan, Preprints The 44th Annual Meeting of the Society of Polymer Science, Japan Published May 10, 1995 (5 pages).
The Society of Polymer Science, Japan, Preprints The 45th Annual Meeting of the Society of Polymer Science, Japan Published May 10, 1996 (8 pages).

*Primary Examiner*—David W. Wu
*Attorney, Agent, or Firm*—Flynn, Thiel, Boutell & Tanis, P.C.

[57] ABSTRACT

A catalyst for producing a poly-α-olefin which comprises a metallocene compound containing an element of group IVA bonded to an organic polymer containing an element of the group IVB; and a process for producing a poly-α-olefin which comprises polymerizing an α-olefin in the presence of the above-described catalyst and also a specified aluminoxane as a co-catalyst.

6 Claims, No Drawings

5,677,255

POLYSILOXANE SUPPORTED METALLOCENE CATALYST FOR OLEFIN POLYMERIZATION

BACKGROUND OF THE INVENTION

1. Field of the Invention

The present invention relates to a catalyst for producing a poly-α-olefin and a process for producing a poly-α-olefin.

2. Description of the Related Art

It is known that poly-α-olefins can be produced by polymerizing an α-olefin in the presence of a metal compound containing a cyclopentadienyl group, an indenyl group, a fluorenyl group or a derivative of such a group as a ligand, i.e. a so-called metallocene compound, in combination with a co-catalyst such as an aluminoxane.

Japanese Patent Laid-Open No. 19309/1983 discloses a process for polymerizing or copolymerizing ethylene and/or an α-olefin in the presence of a catalyst comprising a metallocene compound and an aluminoxane.

Japanese Patent Laid-Open No. 319489/1989 discloses a catalyst for producing a stereospecific olefin polymer, which comprises a transition metal compound containing, as a ligand, a cyclopentadienyl compound crosslinked with silicon and aluminoxane as active components.

However, on the other hand, when a so-called Kaminsky-type catalyst as described above is used, the obtained poly-α-olefin has an extremely low bulk density and poor powder properties, since the catalyst system is soluble in the reaction system.

Recently, Japanese Patent Laid-Open Nos. 276805/1986 and 89505/1988 disclosed that poly-α-olefins having a high bulk density and excellent powder properties are obtained by using a catalyst comprising a solid part comprising such a metallocene compound supported on an inorganic oxide in the form of fine, porous particles and aluminoxane.

Soga et al. reported in Makromol. Chem., Rapid Commun., 15, 139 (1994) that an isotactic polypropylene having a melting point higher than that of the polymer produced in the presence of ordinary Kaminsky-type catalysts can be produced by using a catalyst comprising a combination of a solid part comprising a zirconium compound containing a cyclopentadiene derivative as the ligand and supported on the surface of silica via silicon with aluminoxane or an organoaluminum compound.

However, it is known that the polymerization activity of a catalyst supported on such an inorganic carrier is far lower than that of ordinary Kaminsky-type catalysts.

The reason why the polymerization activity of the catalyst system comprising a supported metallocene compound is lower than that of ordinary Kaminsky-type catalysts is supposed to be as follows: in the above-described process for supporting the metallocene catalyst on the inorganic carrier, the surface hydroxyl groups of the inorganic compound are utilized or the catalyst is supported on the inorganic carrier by physical adsorption. In these processes, the concentration of the formed active species is low and, therefore, the polymerization activity is low, since the amount of surface hydroxyl groups per unit area of the inorganic compound is small and, in addition, the physical adsorption is limited.

DISCLOSURE OF THE INVENTION

Summary of the Invention

An object of the present invention is to provide a highly active catalyst comprising a supported metallocene for producing a poly-α-olefin, and also a process for producing the poly-α-olefin. A catalyst system comprising a metallocene supported on an inorganic carrier in the prior art had only a low activity.

After extensive investigations, the present inventors have succeeded in synthesizing an entirely novel metallocene compound by newly synthesizing an organic polymer compound comprising a metallocene ligand bonded to the main chain and then coordinating a metal with the polymer, and have found that the metallocene compound supported on the polymer is usable as an olefin-polymerization catalyst. The present invention has been accomplished on the basis of this finding.

Thus, the present invention provides a catalyst for producing a poly-α-olefin, which comprises an organometallic polymer of the formula (1):

wherein $M^1$ represents a typical element of group IVB of the periodic table, $R^1$ and $R^2$ each represents an organic ligand selected from the group consisting of a cyclopentadienyl group, an indenyl group, a fluorenyl group and derivatives of these groups, $M^2$ represents a transition metal element of group IVA of the periodic table, X represents a halogen atom, and n represents a positive number of 4 to 18.

The formula (1) may be described as:

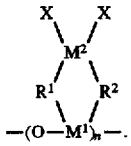

Since the ligand of the metallocene compound is bonded to the main chain of the polymer in the catalyst of the present invention, it can be expected that the amount of the metal of the metallocene compound bonded to the polymer is remarkably increased as compared with that supported on the ordinary inorganic compound and that, as a result, the concentration of the polymerization-active species is increased to increase also the polymerization activity.

Further, the present invention provides a process for producing the catalyst as defined above, which comprises steps of reacting water with an organic compound of the formula (3):

$$R^1R^2M^1X_2 \qquad (3)$$

wherein $M^1$ represents a typical element of the group IVB of the periodic table, $R^1$ and $R^2$ each represents an organic ligand selected from the group consisting of a cyclopentadienyl group, an indenyl group, a fluorenyl group and derivatives of these groups, and X represents a halogen atom, to obtain an organic polymer and reacting the organic polymer with a chloride of a metal of group IVA.

In addition, the present invention provides a process for producing an olefinic polymer, which comprises the step of polymerizing an α-olefin in the presence of the catalyst as defined above and, as a co-catalyst, a trialkylaluminum compound of formula (4):

$$Al(R^3)_3 \qquad (4)$$

wherein $R^3$ represents an alkyl group having 1 to 10 carbon atoms.

or a water-modified organoaluminum compound obtained by modifying the trialkylaluminum compound with water.

The term, "α-olefin" in the present invention includes also ethylene.

It is preferable that the organometallic polymer has formula (2):

—[O—SiR¹R²ZrCl₂]ₙ—     (2)

wherein R¹ and R² each represents an organic ligand selected from the group consisting of a cyclopentadienyl group, an indenyl group, a fluorenyl group and derivatives of these groups, and n represents a positive number of 4 to 18.

Formula (2) may be described as:

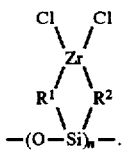

The catalyst may be preferably obtained by physically adsorbing the organometallic polymer on fine, porous particles of an inorganic oxide.

In a preferred embodiment, at least one (particularly both) of R¹ and R² represent an organic ligand(s) selected from the group consisting of a cyclopentadienyl group, derivatives of cyclopentadienyl group, derivatives of indenyl group and derivatives of fluorenyl group. In a still more preferred embodiment, one of R¹ and R² represents a cyclopentadienyl group or a derivative thereof, and the other represents a cyclopentadienyl group, an indenyl group, a fluorenyl group, a derivative of cyclopentadienyl group, a derivative of indenyl group or a derivative of fluorenyl group. In a still more preferred embodiment at least one (particularly both) of R¹ and R² represent an organic ligand(s) selected from the group consisting of a cyclopentadienyl group, derivatives of cyclopentadienyl group having 1 to 3 substituents bonded to the cyclopentadienyl group, derivatives of indenyl group and derivatives of fluorenyl group. In a particularly preferred embodiment, R¹ and R² each represents a cyclopentadienyl group or a derivative thereof. In the most preferred embodiment, R¹ and R² each represents a derivative of cyclopentadienyl group having 1 to 3 substituents bonded to the cyclopentadienyl group.

DETAILED DESCRIPTION OF THE INVENTION

The metal, M², in the chloride of the metal of group IVA used in the present invention is preferably zirconium, hafnium or titanium, with zirconium being particularly preferred.

The organic ligands, R¹ and R², of the organic compound of formula (3) used in the present invention are each a ligand of a cyclopentadienyl group, an indenyl group, a fluorenyl group or a derivative of such a group, and R¹ and R² may be the same or different from each other. Examples of derivatives of the cyclopentadienyl group include 1,2,3,4-tetramethylcyclopentadienyl group, 2,3,5-trimethylcyclopentadienyl group, 3,4-dimethylcyclopentadienyl group and t-butylcyclopentadienyl group. Among the derivatives of the cyclopentadienyl group, those having 1 to 3, particularly 3, substituents bonded to the cyclopentadienyl group are preferred. Examples of the derivatives of of indenyl group include 2,4,7-trimethylindenyl group, tetrahydroindenyl group, 2-methylindenyl group and 2-ethyl-4-phenylindenyl group. An example of a derivative of the fluorenyl group include 1-methylfluorenyl group.

The typical elements of group IVB, i.e., M¹, are silicon, tin and germanium, with silicon and tin being particularly preferred from the viewpoint of reactivity.

Examples of halogen atoms, X, include a chlorine atom, a bromine atom and a fluorine atom. Two X's may be the same or different from each other, though they are usually the same.

The organometallic polymer of formula (1) comprising the metallocene compound containing the above-described element of group IVA bonded to the organic polymer containing the above-described element of group IVB may be physically adsorbed on fine, porous particles of an inorganic oxide. The product thus obtained (i.e., a catalyst supported on an inorganic oxide) is also an effective catalyst for the polymerization of olefins and is particularly desirable for the production of a polymer having a high melting point and a large particle diameter.

The fine, porous particles of the inorganic oxides usable in the present invention include silica, magnesium chloride and alumina.

The co-catalysts usable in the present invention include trialkylaluminum compounds of formula (4):

Al(R³)₃     (4)

wherein R³ represents an alkyl group having 1 to 10 carbon atoms, and water-modified organoaluminum compounds (i.e., aluminoxanes) obtained by modifying the trialkylaluminum compounds with water.

The three R³'s may be the same or different from one another. A particularly preferable example of the co-catalyst include methylaluminoxane which is obtained by modifying trimethylaluminum with water.

The polymerization method and polymerization conditions are not particularly limited in the process of the present invention. Well-known methods for the polymerization of α-olefins can be employed, including the solvent polymerization method wherein an inert hydrocarbon medium is used, and also the bulk polymerization and gas-phase polymerization methods conducted in the substantial absence of any inert hydrocarbon medium. Usually, the polymerization temperature is −100° to 200° C. and the polymerization pressure is atmospheric pressure to 100 kg/cm². Preferably, they are −50° to 100° C. and atmospheric pressure to 50 kg/cm², respectively.

The hydrocarbons used as the medium in the treatment of the catalyst component or the polymerization of α-olefins in the present invention include saturated hydrocarbons such as pentane, hexane, heptane, octane, nonane, decane, cyclopentane and cyclohexane and also aromatic hydrocarbons such as benzene, toluene and xylene.

The α-olefins to be polymerized include those having 2 to 25, preferably 3 to 25, carbon atoms such as ethylene, propylene, 1-butene, 4-methyl-1-pentene, 1-hexene, 1-octene and 1-decene.

EXAMPLES

The following Examples will further illustrate the present invention, but by no means limit the invention.

EXAMPLE 1

<Synthesis of organic ligand>

Silicon tetrachloride (40 mmol) was dissolved in 50 ml of tetrahydrofuran (THF), and 160 ml of a 0.5M solution of indenyllithium in THF was added to the resultant solution. After the obtained mixture was stirred for 12 h, the reaction solution was concentrated and evaporated to dryness. 200 ml of toluene was added to the solid and the solution thus obtained was filtered to remove solid lithium chloride. Then, the filtrate was concentrated to recrystallize the product, thereby obtaining 5 g of $(Indenyl)_2SiCl_2$. $(Fluorenyl)_2SiCl_2$ and $(Indenyl)(Fluorenyl)SiCl_2$ were synthesized in the same manner as that described above. The solid products thus obtained were identified by $^1$H-NMR spectrometry.

<Preparation of catalyst>

Catalyst A 3.3 g of $(Indenyl)_2SiCl_2$ was added to 100 ml of toluene and an excess amount of water was reacted with this compound to synthesize the organic polymer. The polymer thus obtained was dried and dissolved in THF. Then, butyllithium (12 ml of the 1.6M solution in hexane) was added to the solution, and the resultant mixture was kept under violent stirring for 8 h. 3.2 g of $ZrCl_4(THF)_2$ was added to the mixture at −78° C., and the resultant mixture was kept under violent stirring for 12 h. Then, THF was distilled off and toluene was added to the residue. Lithium chloride insoluble in toluene was separated by filtration in a nitrogen atmosphere, and the intended organometallic polymer was obtained from the toluene solution by recrystallization. The obtained solid product was dried at 40° C. under a reduced pressure for 4 h to obtain catalyst A (solid product). The amount of zirconium supported on the organic polymer was about 1.5 mmol per gram of catalyst A.

Catalyst B

Catalyst B was prepared in the same manner as that for the preparation of catalyst A except that 3.3 g of the $(Indenyl)_2SiCl_2$ was replaced with 3.8 g of $(Indenyl)(Fluorenyl)SiCl_2$. The solid thus recovered was analyzed to find that the amount of zirconium supported on the organic polymer was about 1.2 mmol per gram of catalyst B.

Catalyst C

Catalyst C was prepared in the same manner as that for the preparation of catalyst A except that 3.3 g of the $(Indenyl)_2SiCl_2$ was replaced with 5.9 g of $(Fluorenyl)_2SiCl_2$. The solid thus recovered was analyzed to find that the amount of zirconium supported on the organic polymer was about 1.3 mmol per gram of catalyst C.

Catalyst D

Catalyst D was synthesized by a method reported by Soga et al. in Makromol. Chem., Rapid Commun., 15, 139 (1994). Namely, 10.0 g of silica gel fired at 200° C. for 8 h was suspended in 100 ml of toluene, and 3.3 g of $(Indenyl)_2SiCl_2$ was added to the suspension. The solution thus obtained was heated under reflux at 120° C. for 12 h. Then, butyllithium (12 ml of the 1.6M solution in hexane) was added to the solution, and the resultant mixture was kept under violent stirring for 8 h. 3.2 g of $ZrCl_4(THF)_2$ was added to the mixture at −78° C., and the resultant mixture was kept under violent stirring for 12 h. Then, the solid was separated by filtration in a nitrogen atmosphere, washed with a large amount of THF five times and then dried at 40° C. under a reduced pressure for 4 h to obtain catalyst D (solid product). The amount of zirconium supported on the silica gel was about 0.48 mmol per gram of catalyst D.

(Experiment 1—polymerization—catalyst A)

Predetermined amounts of purified toluene and methylaluminoxane were fed into a 0.1 l stainless steel autoclave reactor having an electromagnetic stirring rod in a nitrogen atmosphere, and 0.01 mmol (calculated in terms of zirconium atom) of catalyst A and then 7 dm$^3$ of propylene were fed into the autoclave reactor to initiate polymerization. The amount of methylaluminoxane added was 50.0 mmol (calculated in terms of aluminum atom) and that of toluene was such that the total amount of the polymerization solution would be 30 ml.

The polymerization was conducted at 40° C. for 6 h and then terminated by adding methanol containing a small amount of hydrochloric acid. Then the reaction solution was introduced into a large excess of methanol. The solid part was separated by filtration, washed with methanol and dried under a reduced pressure.

The solid thus obtained was extracted with boiling pentane for 6 h to separate the atactic component from the desired polymer. Thus, the desired polymer as the final product was obtained.

With respect to the thus-obtained polymer, various evaluations were effected. That is, the activity of the catalyst, and the yield, melting point, molecular weights (Mw and Mn) and isotactic pentad fraction were determined.

The yield of the polymer was defined as the weight (mg) of the polymer as the final product. The activity of the catalyst [unit: kg-polypropylene/mol·Zr·h)] was calculated by dividing the yield (unit: kg) of the polymer by the amount of the catalyst (calculated in terms of Zr atom) used (unit: mol) and the time employed for the polymerization (unit: hour). The melting point was determined by DSC. The molecular weights (Mw and Mn) are those calculated in terms of styrene determined by GPC. The isotactic pentad fraction was determined by $^{13}$C-NMR spectrometry. The results are given in Table 1.

(Experiment 2—polymerization—catalyst B)

The polymerization was conducted in the same manner as that of Experiment 1 except that catalyst B was used as the polymerization catalyst. The results are given in Table 1.

(Experiment 3—polymerization—catalyst C)

The polymerization was conducted in the same manner as that of Experiment 1 except that catalyst C was used as the polymerization catalyst. The results are given in Table 1.

(Experiment 4—polymerization—catalyst D)

Predetermined amounts of purified toluene and methylaluminoxane were fed into a 0.1 l stainless steel autoclave reactor having an electromagnetic stirring rod in a nitrogen atmosphere, and 0.1 mmol (calculated in terms of zirconium atom) of catalyst D and then 7 dm$^3$ of propylene were fed into the autoclave reactor to initiate polymerization. The amount of methylaluminoxane added was 10.0 mmol (calculated in terms of aluminum atom) and that of toluene was such that the total amount of the polymerization solution would be 30 ml.

The polymerization was conducted at 40° C. for 6 h and then terminated by adding methanol containing a small amount of hydrochloric acid. Then, the reaction solution was introduced into a large excess of methanol. The solid part was separated by filtration, washed with methanol and dried under a reduced pressure.

The solid thus obtained was extracted with boiling o-dichlorobenzene for 15 h to separate the polymer from the catalyst residue. The polymer thus obtained was extracted with pentane to separate the atactic component from the desired polymer. Thus, the desired polymer as the final product was obtained.

With respect to the thus-obtained polymer, various evaluations were effected in the same manner as those in Experiment 1. The results are given in Table 1.

(Experiment 5—polymerization—Kaminsky-type catalyst)

The polymerization was conducted in the same manner as that of Experiment 4 except that $Me_2Si(Ind)_2ZrCl_2$, which is an ordinary Kaminsky-type catalyst, was used as the polymerization catalyst. The results are given in Table 1.

TABLE 1

|  | Expt. No. 1 | Expt. No. 2 | Expt. No. 3 | Expt. No. 4 | Expt. No. 5 |
| --- | --- | --- | --- | --- | --- |
| Yield (mg) | 1700 | 500 | 200 | 10 | 1800 |
| Activity (kg-PP/mol.Zr.h) | 73.3 | 22.5 | 15.5 | 0.31 | 74.0 |
| Melting point (°C.) | 141.7 | 145.5 | 142.3 | 163.0 | 142.1 |
| Mw | 29,000 | 57,000 | 48,000 | 340,000 | 30,000 |
| Mw/Mn | 2.6 | 3.6 | 6.1 | 3.8 | 3.0 |
| mmmm (%) | 89 | 93 | 90 | 94 | 82 |

EXAMPLE 2

Catalyst C-1

2 g of catalyst C was dissolved in 50 ml of toluene and 1 g of silica having treated surface hydroxyl groups was added to the solution. The mixture thus obtained was heated under reflux at 120° C. for 8 h. Then, the solid part was separated by filtration in a nitrogen atmosphere, washed with a large amount of toluene five times and dried at 40° C. under a reduced pressure for 4 h to obtain the catalyst C-1 (solid product). The amount of the supported zirconium was 0.03 mmol/g per gram of catalyst C-1.

Catalyst B-1

1.8 g of catalyst B was dissolved in 50 ml of toluene and 1 g of silica having treated surface hydroxyl groups was added to the solution. The mixture thus obtained was heated under reflux at 120° C. for 8 h. Then, the solid part was separated by filtration in a nitrogen atmosphere, washed with a large amount of toluene five times and dried at 40° C. under a reduced pressure for 4 h to obtain catalyst B-1 (solid product). The amount of the supported zirconium was 0.05 mmol/g per gram of catalyst B-1.

(Experiment 6—polymerization—catalyst C-1)

Predetermined amounts of purified toluene and methylaluminoxane were fed into a 0.1 l stainless steel autoclave reactor having an electromagnetic stirring rod in a nitrogen atmosphere, and 0.01 mmol (calculated in terms of zirconium atom) of catalyst C-1 and then 7 dm³ of propylene were fed into the autoclave reactor to initiate polymerization. The amount of methylaluminoxane added was 50.0 mmol (calculated in terms of aluminum atom) and that of toluene was such that the total amount of the polymerization solution would be 30 ml.

The polymerization was conducted at 40° C. for 24 h and then terminated by adding methanol containing a small amount of hydrochloric acid. Then, the reaction solution was introduced into a large excess of methanol. The solid part was separated by filtration, washed with methanol and dried under a reduced pressure.

The solid thus obtained was extracted with boiling o-dichlorobenzene for 6 h to separate the polymer from the catalyst residue. The polymer thus obtained was extracted with boiling pentane to separate the atactic component from the desired polymer. Thus, the desired polymer as the final product was obtained.

With respect to the thus-obtained polymer, various evaluations were effected in the same manner as those in Experiment 1. The results are given in Table 2.

(Experiment 7—polymerization—catalyst B-1)

Predetermined amounts of purified toluene and methylaluminoxane were fed into a 0.1 l stainless steel autoclave reactor having an electromagnetic stirring rod in a nitrogen atmosphere, and 0.01 mmol (calculated in terms of zirconium atom) of catalyst B-1 and then 7 dm³ of propylene were fed into the autoclave reactor to initiate polymerization. The amount of methylaluminoxane added was 50.0 mmol (calculated in terms of aluminum atom) and that of toluene was such that the total amount of the polymerization solution would be 30 ml.

The polymerization was conducted at 40° C. for 24 h and then terminated by adding methanol containing a small amount of hydrochloric acid. Then, the reaction solution was introduced into a large excess of methanol. The solid part was separated by filtration, washed with methanol and dried under a reduced pressure.

The solid thus obtained was extracted with boiling o-dichlorobenzene for 6 h to separate the polymer from the catalyst residue. The polymer thus obtained was extracted with boiling pentane to separate the atactic component from the desired polymer. Thus, the desired polymer as the final product was obtained.

With respect to the thus-obtained polymer, various evaluations were effected in the same manner as those in Experiment 1. The results are given in Table 2.

TABLE 2

|  | Expt. No. 6 | Expt. No. 7 |
| --- | --- | --- |
| Yield (mg) | 210 | 350 |
| Activity (kg-PP/mol.Zr.h) | 0.9 | 1.5 |
| Melting point (°C.) | 159.3 | 157.5 |
| Mw | 21,600 | 15,100 |
| Mw/Mn | 9.7 | 7.6 |
| mmmm (%) | 89 | 93 |

EXAMPLE 3

<Synthesis of organic ligand>

4 g of $(cyclopentadienyl)_2SiCl_2$ was prepared in the same manner as shown in Example 1, except that 160 ml of the 0.5M solution of indenyllithium in THF was replaced with 80 ml of a 1.0M solution of cyclopentadienyllithium in THF, toluene was replaced with hexane, and that recystallization was not conducted but distillation at 150° C. at 5 mmHg was conducted. The obtained liquid product was identified with $^1$H-NMR spectrometry.

Preparation of Catalyst E

Using 2.3 g of $(cyclopentadienyl)_2SiCl_2$ in place of 3.3 g of the $(indenyl)_2SiCl_2$, catalyst E was prepared in the same manner as that for the preparation of catalyst A. The amount of zirconium supported on the organic polymer was about 1.0 mmol per gram of catalyst E.

(Experiment 8—polymerization—catalyst E)

The polymerization was conductd in the same manner as that of Experiment 1 except that 0.01 mmol (calculated in terms of zirconium atom) of catalyst E was used in place of catalyst A. About 0.1 g of polypropylene was obtained. Every polypropylene thus obtained was found to be atactic, and soluble in boiling pentane. The molecule weight (Mw) thereof was 4,000 and the ratio of Mw/Mn was 3.8. The activity thereof was found to be 0.2 kg-PP/mol·Zr·h.

What we claim is:

1. A catalyst for producing a poly-α-olefin, which comprises an organometallic polymer of formula (1):

$$—(O—M^1R^1R^2M^2X_2)_n— \quad (1)$$

wherein $M^1$ represents an element of group IVB of the periodic table, $R^1$ and $R^2$ each represents an organic ligand selected from the group consisting of a cyclopentadienyl group, an indenyl group, a fluorenyl group and derivatives of these groups, said derivatives being selected from the group consisting of 1, 2, 3, 4-tetramethylcyclopentadienyl, 2, 3, 5-trimethylcyclopentadienyl, 3, 4-dimethylcyclopentadienyl, t-butylcyclopentadienyl, 2, 4, 7-trimethylindenyl, tetrahydroindenyl, 2-methylindenyl, 2-ethyl-4-phenylindenyl and 1-methylfluorenyl, $M^2$ represents a transition metal element of group IVA of the periodic table, X represents a halogen atom, and n represents a positive number of 4 to 18.

2. The catalyst as claimed in claim 1, wherein the organometallic polymer is of formula (2):

$$—(O—SiR^1R^2ZrCl_2)_n— \quad (2).$$

3. The catalyst as claimed in claim 1, wherein at least one of $R^1$ and $R^2$ represent an organic lingand(s) selected from the group consisting of a cyclopentadienyl group, the derivatives of the cyclopentadienyl group, the derivatives of the indenyl group and the derivative of the fluorenyl group.

4. The catalyst as claimed in claim 1, which has been obtained by physically adsorbing the organometallic polymer on fine, porous particles of an inorganic oxide.

5. A process for producing the catalyst as defined in claim 1, which comprises the steps of reacting water with an organic compound of formula (3):

$$R^1R^2M^1X_2 \quad (3)$$

wherein $M^1$ represents an element of group IVB of the periodic table, $R^1$ and $R^2$ each represents an organic ligand selected from the group consisting of a cyclopentadienyl group, an indenyl group, a fluorenyl group and derivatives of these groups, said derivatives being selected from the group consisting of 1, 2, 3, 4-tetramethylcyclopentadienyl, 2, 3, 5-trimethylcyclopentadienyl, 3, 4-dimethylcyclopentadienyl, t-butylcyclopentadienyl, 2, 4, 7-trimethylindenyl, tetrahydroindenyl, 2-methylindenyl, 2-ethyl-4-phenylindenyl and 1-methylfluorenyl, and X represents a halogen atom, to obtain an organic polymer and reacting the organic polymer with a chloride of a metal of group IVA.

6. The process as claimed in claim 5, wherein at least one $R^1$ and $R^2$ represent an organic ligand(s) selected from the group consisting of the cyclopentadienyl group, the derivatives of the cyclopentadienyl group, the derivatives of the indenyl group and the derivative of the fluorenyl group.

* * * * *